US011703353B2

(12) United States Patent
Marolia et al.

(10) Patent No.: US 11,703,353 B2
(45) Date of Patent: Jul. 18, 2023

(54) ERROR CORRECTION FOR GPS-BASED MILEAGE TRACKING

(71) Applicant: Spireon, Inc., Irvine, CA (US)

(72) Inventors: Sunil B. Marolia, Laguna Niguel, CA (US); Shawn R. Hardesty, San Clemente, CA (US); Wallace F. Tennelle, Irvine, CA (US)

(73) Assignee: Spireon, Inc., Irvine, CA (US)

(*) Notice: Subject to any disclaimer, the term of this patent is extended or adjusted under 35 U.S.C. 154(b) by 325 days.

(21) Appl. No.: 17/113,225

(22) Filed: Dec. 7, 2020

(65) Prior Publication Data
US 2021/0173092 A1 Jun. 10, 2021

Related U.S. Application Data

(60) Provisional application No. 62/943,973, filed on Dec. 5, 2019.

(51) Int. Cl.
G01C 22/00 (2006.01)
G01S 19/14 (2010.01)
G01S 19/25 (2010.01)
G01S 19/10 (2010.01)
G01S 19/20 (2010.01)

(52) U.S. Cl.
CPC .............. G01C 22/00 (2013.01); G01S 19/10 (2013.01); G01S 19/14 (2013.01); G01S 19/20 (2013.01); G01S 19/252 (2013.01)

(58) Field of Classification Search
CPC .......... G01S 19/49; G01S 19/22; G01S 19/14; G01C 22/00; G01C 22/002; G01C 22/004
See application file for complete search history.

(56) References Cited

U.S. PATENT DOCUMENTS

| 2002/0087704 | A1 | 7/2002 | Chesnais et al. | |
| 2005/0203892 | A1 | 9/2005 | Wesley et al. | |
| 2007/0050332 | A1 | 3/2007 | Grenzberg et al. | |
| 2008/0288768 | A1 | 11/2008 | Barowski et al. | |
| 2009/0099725 | A1* | 4/2009 | Pesch | G01C 22/00 701/33.4 |
| 2009/0112630 | A1 | 4/2009 | Collins, Jr. et al. | |
| 2009/0287369 | A1 | 11/2009 | Nielsen | |
| 2011/0227722 | A1 | 9/2011 | Salvat | |
| 2013/0196688 | A1* | 8/2013 | Lu | A61B 5/1112 455/456.1 |
| 2015/0335291 | A1* | 11/2015 | Saadi | G01S 19/35 702/141 |
| 2019/0035172 | A1* | 1/2019 | Seaman | G07C 5/02 |

* cited by examiner

Primary Examiner — Cassi J Galt
(74) Attorney, Agent, or Firm — Luedeka Neely Group PC

(57) ABSTRACT

A method for compensating for the absence of GPS data during a period of GPS signal loss in determining travel mileage of a vehicle includes: detecting vehicle motion using an accelerometer during a period of time in which a GPS tracking device is unable to determine a location of the vehicle due to loss of GPS signal; determining a first location of the vehicle corresponding to the last known GPS location data point stored in memory; determining a second location of the vehicle corresponding to a point at which the GPS signal is reacquired; and calculating the distance between the first and second locations based on a straight-line distance calculation between the first and second locations, or based on the use of geospatial mapping data to plot a roadway route between the first and second locations.

2 Claims, 1 Drawing Sheet

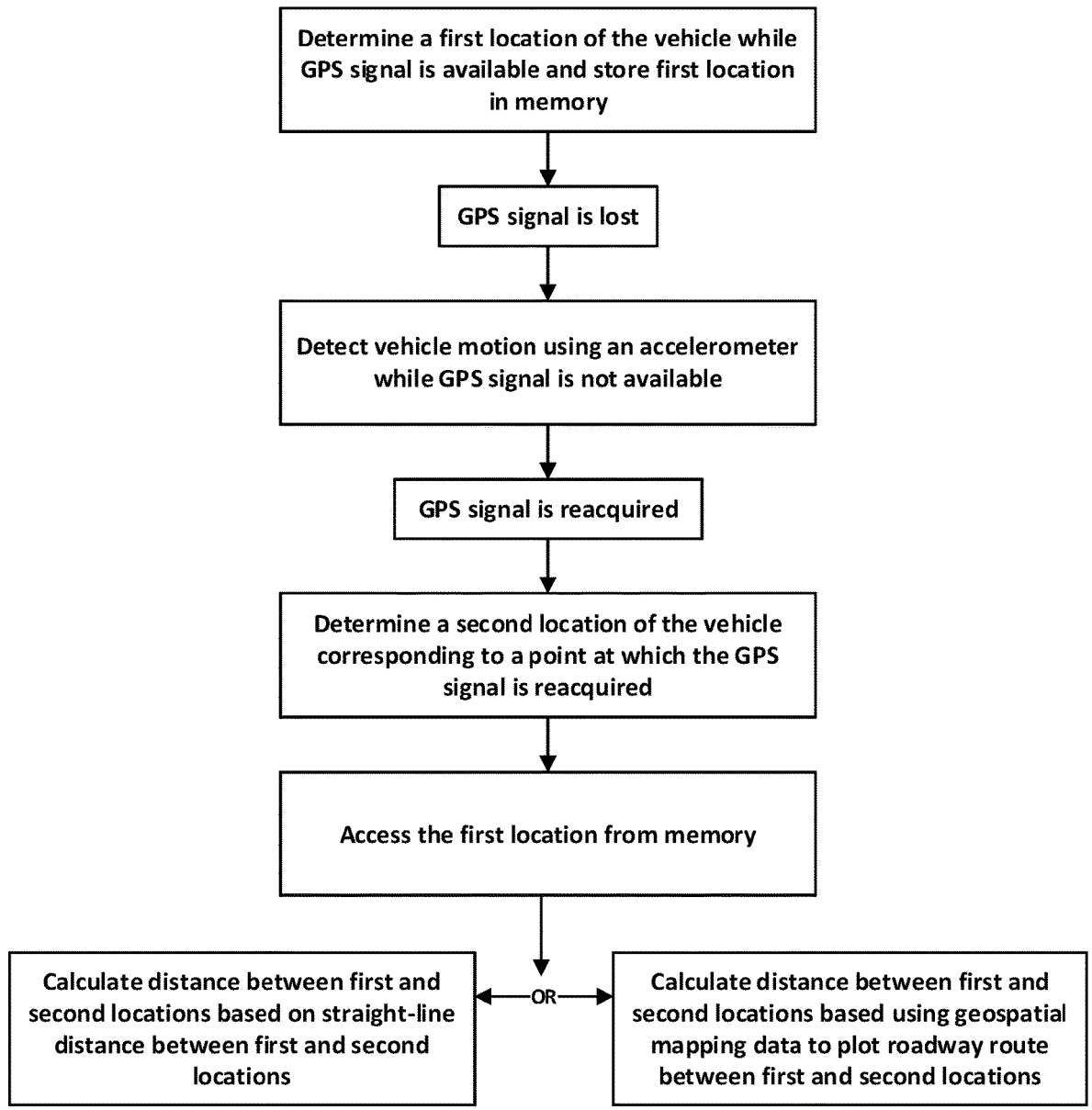

ERROR CORRECTION FOR GPS-BASED MILEAGE TRACKING

BACKGROUND

In telematics applications, the use of a vehicle's CAN bus to extract actual vehicle odometer values may be problematic due to the proprietary nature of the protocols and codes used by each vehicle manufacturer. To overcome this limitation, an approximate cumulative vehicle mileage can be measured utilizing aftermarket GPS devices that can track location and measure driving distances using only the GPS receivers and the GPS network of satellites. However, this alternative method is subject to errors that accumulate over time and produce results that are no longer useful for consumer and business applications.

Errors in accumulated mileage are generated from several sources including but not limited to the following:

The time required to acquire a GPS signal lock. During periods of time that the vehicle is moving while the GPS tracking device is on but does not have signal lock, the vehicle movement is not being captured in the overall total driven miles calculation.

Loss of satellite signal due to obstructions. GPS signal loss can occur when the vehicle travels under bridges, within tunnels, and in other geographical areas where the GPS signal is blocked. During this loss of signal, the GPS device is no longer able to track movement which adds to the error in calculating actual mileage driven.

GPS device turning off for power savings. —The GPS receiver may also be off while the vehicle is moving. For example, if the GPS device has voltage sensing capability, and the sensed voltage is lower than the device's wake threshold, the GPS device will be in a sleep state and not effectively tracking movement. This creates errors in the calculation of overall mileage driven.

BRIEF DESCRIPTION OF THE DRAWINGS

Other embodiments of the invention will become apparent by reference to the detailed description in conjunction with the FIGURE, wherein elements are not to scale so as to more clearly show the details, wherein like reference numbers indicate like elements throughout the several views, and wherein:

FIG. 1 depicts a method for compensating for the absence of GPS data during a period of GPS signal loss in determining travel mileage of a vehicle according to an embodiment of the invention.

DETAILED DESCRIPTION

Embodiments of an invention described herein provide a solution to automate error correction for each trip so as to maintain a more accurate calculation of actual mileage driven by a vehicle.

Some embodiments utilize additional sensors to detect vehicle movement, and access known historic information about geographic locations to account for mileage that was not captured by the GPS device alone. Starting with a GPS device in a hibernation mode in which the GPS receiver has been turned off, an onboard accelerometer with reasonably high sensitivity detects the vehicle's first movement and instantly marks its current location based on its last known location. Although the GPS device does not have a signal lock, the device can re-use its last known location (point A) as a starting point for a trip. At some point during this time of signal loss (aka the "dark period"), the GPS receiver wakes up and begins to acquire a GPS signal while the vehicle is in motion. Once the GPS signal is acquired, the device can start accumulating mileage. However, the exact distance travelled between the time that motion started at Point A and the time that the device acquired a GPS signal lock (point B) is unknown. Embodiments of the invention utilize the tagged last known location (point A) and the newly acquired GPS location (point B) to calculate the missing mileage, and this difference is automatically added to the mileage calculation.

Various correction options provide varying degrees of accuracy:

Straight line method. Calculating a straight line distance from point A to point B is simple but it provides the least accurate correction, as it does not account for actual turn-by-turn mileage that accumulates during the dark period.

Geographic map assisted method. Utilizing the two known points A and B that represent the start and end points of the "dark period," this method assumes that a certain route has been taken based on a known geographic map with detailed road information, and based on that route infers the actual mileage driven from point A to point B.

Embodiments of the invention support either of the above described methods to provide error correction for missed mileage. While the description above is directed to the situation of the vehicle beginning as parked prior to beginning motion, embodiments of the invention are equally applicable to cases in which the GPS device loses the GPS signal while the vehicle is in continuous motion. In such cases, the onboard accelerometer continues to detect movement thereby allowing for the capture of point A as corresponding to the time of GPS signal loss and point B as corresponding to the time of GPS signal reacquisition, and performance of error correction methods as described above to calculate the missing mileage.

Whereas prior correction techniques are focused on the correction of miniscule errors due to GPS measurement inaccuracies, such as drift, embodiments of this invention compensate for more drastic errors due to real-world scenarios in which the availability of GPS signal coverage cannot be guaranteed for the entirety of a vehicle trip. The embodiments rely on alternative sensors such as an accelerometer to detect motion, and the merging of known motion with historical vehicle location, and the calculation of error correction by pulling geospatial data of the collection of points without requiring GPS signal lock during the entire period.

The invention claimed is:

1. A method for compensating for the absence of GPS data during a period of GPS signal loss in determining travel mileage of a vehicle, comprising:

a GPS receiver of a GPS device in the vehicle determining a first location of the vehicle based on a GPS signal while the GPS signal is available;

storing the first location in memory of the GPS device;

detecting vehicle motion using an accelerometer in the vehicle during a period of time in which the GPS receiver is unable to determine a location of the vehicle due to loss of the GPS signal;

based on detection of motion using the accelerometer, accessing from the memory the first location corresponding to a last known GPS location of the vehicle;

the GPS receiver reacquiring the GPS signal and determining, based on the GPS signal, a second location of the vehicle corresponding to a point at which the GPS signal is reacquired; and the GPS device calculating the distance between the first and second locations to determine travel mileage of the vehicle during the period of GPS signal loss, the calculating based on:

a straight-line distance calculation between the first and second locations; or using geospatial mapping data to plot a roadway route between the first and second locations.

2. The method of claim 1 wherein the vehicle is stationary or in motion at the time that the first location is determined.

* * * * *